US010903988B1

(12) United States Patent
Belmar et al.

(10) Patent No.: US 10,903,988 B1
(45) Date of Patent: Jan. 26, 2021

(54) UNIQUE INSTRUCTION IDENTIFIER THAT IDENTIFIES COMMON INSTRUCTIONS ACROSS DIFFERENT CODE RELEASES

(71) Applicant: International Business Machines Corporation, Armonk, NY (US)

(72) Inventors: Brenton Belmar, New Paltz, NY (US); Elliott Binder, Port Allegany, PA (US); Christopher Raymond Conklin, Stone Ridge, NY (US); Eric Mark Schwarz, Gardiner, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/672,605

(22) Filed: Nov. 4, 2019

(51) Int. Cl.
*G06F 9/44* (2018.01)
*H04L 9/08* (2006.01)
*H04L 9/06* (2006.01)
*G06F 9/30* (2018.01)
*G06F 11/36* (2006.01)
*G06F 8/71* (2018.01)
*G06F 9/355* (2018.01)

(52) U.S. Cl.
CPC .............. *H04L 9/0825* (2013.01); *G06F 8/71* (2013.01); *G06F 9/30178* (2013.01); *G06F 9/355* (2013.01); *G06F 11/3684* (2013.01); *G06F 11/3688* (2013.01); *H04L 9/0643* (2013.01)

(58) Field of Classification Search
None
See application file for complete search history.

(56) References Cited

U.S. PATENT DOCUMENTS

| 6,098,079 A * | 8/2000 | Howard ............... G06F 16/137 |
| 7,458,099 B1 | 11/2008 | Nachenberg et al. |
| 8,793,250 B1 * | 7/2014 | Gorde .................. G06F 16/219 |
| | | 707/737 |
| 9,361,458 B1 * | 6/2016 | Feng ..................... G06F 21/564 |
| 10,203,953 B2 * | 2/2019 | Martin ................. H04L 9/0643 |
| 2006/0130020 A1 * | 6/2006 | Abdullah ................ G06F 8/54 |
| | | 717/140 |

(Continued)

FOREIGN PATENT DOCUMENTS

EP 1035482 A2 9/2000

*Primary Examiner* — Anna C Deng
(74) *Attorney, Agent, or Firm* — Cantor Colburn LLP; Edward Wixted

(57) ABSTRACT

Aspects of the invention include receiving a first dictionary that includes key/value pairs for a first code listing. Key instances of the first dictionary include instruction addresses of the first code listing, and value instances of the first dictionary include hashes of data that uniquely identify instructions at the instruction addresses in the first code listing. A second dictionary that includes key/value pairs for a second code listing is received. Key instances of the second dictionary include hashes of data that uniquely identify instructions at instruction addresses in the second code listing, and value instances of the second dictionary include instruction addresses of the second code listing. A match between a value instance of the first dictionary and a key instance of the second dictionary is identified. Responsive to identifying the match, an instruction address is translated between the first code listing and the second code listing.

19 Claims, 6 Drawing Sheets

(56) References Cited

U.S. PATENT DOCUMENTS

| | | | |
|---|---|---|---|
| 2016/0028546 A1* | 1/2016 | Futral | H04L 9/3242 |
| | | | 713/193 |
| 2017/0324829 A1* | 11/2017 | Voronkov | G06F 16/9574 |
| 2017/0371687 A1* | 12/2017 | Haiderzaidi | G06F 11/3604 |

* cited by examiner

|   | 302a | 304a | 306a | 308a | 310a | 312a | 314a | 316a |
|---|------|------|------|------|------|------|------|------|
| 0 |      |      |      |      | 021813A2 |          | 218723 | MODULE1_JUMP_ENTRY EQU * |
| 1 | 021813A2 | 8904 | 0002 |  |          |          | 218725 | LGR    R8,R2 |
| 2 | 02181386 | E310 | C198 | 0024 |     | 00000198 | 218707 | STG    R8,TEMP1 |
| 3 | 021813AC | EC10 | 30BF | 0055 |     | 00000000 | 218736 | RISBGZ R1,R0,48,63,0 |
| 4 | 021813B2 | 8982 | 0022 |  |          |          | 218737 | XGR    R2,R2 |
| 5 | 021813B6 | 8904 | 0002 |  |          |          | 218738 | LGR    R8,R2 |

332a

|   | 302b | 304b | 306b | 308b | 310b | 312b | 314b | 316b |
|---|------|------|------|------|------|------|------|------|
| 0 |      |      |      |      | 021814A2 |          | 218823 | MODULE1_JUMP_ENTRY EQU * |
| 1 | 021814A2 | 8904 | 0002 |  |          |          | 218825 | LGR    R8,R2 |
| 2 | 02181486 | E310 | C198 | 0024 |     | 00000198 | 218807 | STG    R8,TEMP1 |
| 3 | 021814AC | EC10 | 30BF | 0055 |     | 00000000 | 218836 | RISBGZ R1,R0,48,63,0 |
| 4 | 02181482 | 8982 | 0022 |  |          |          | 218837 | XGR    R2,R2 |
| 5 | 02181486 | 8904 | 0002 |  |          |          | 218738 | LGR    R8,R2 |

UNIQUE INSTRUCTION IDENTIFIER THAT IDENTIFIES COMMON INSTRUCTIONS ACROSS DIFFERENT CODE RELEASES

BACKGROUND

The present invention generally relates to computer software code, and more specifically, to a unique instruction identifier that identifies common instructions across different code releases.

It is typical for a software company to support multiple releases of a software program. When the software code is updated, this requires multiple versions of the software to be updated and tested. Test cases are generated to exercise particular portions of the software code to ensure that the updates are operating properly and that they don't introduce new errors when the software code is executed. The testing of the particular portions requires the identifying of the portions to be tested in the source code of each of the releases. Comparing source code, such as assembler listings, from different versions of the software code is a difficult and largely manual task because the instruction addresses change as lines of code are added and deleted between releases.

SUMMARY

Embodiments of the present invention include a unique identifier that identifies common instructions across different code releases. A non-limiting example computer-implemented method includes receiving, by a processor, a first dictionary for a first code listing. The first dictionary includes a plurality of key/value pairs. Key instances of the first dictionary include instruction addresses of the first code listing and value instances of the first dictionary include hashes of data that uniquely identify instructions at the instruction addresses in the first code listing. A second dictionary for a second code listing is received by the processor. The second dictionary includes a plurality of key/value pairs. Key instances of the second dictionary include hashes of data that uniquely identify instructions at instruction addresses in the second code listing, and value instances of the second dictionary include instruction addresses of the second code listing. A match between a value instance of the first dictionary and a key instance of the second dictionary is identified by the processor. Responsive to identifying the match, the processor translates an instruction address between the first code listing and the second code listing.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3A depicts an example of software code listings according to one or more embodiments of the present invention;

Figure 1:
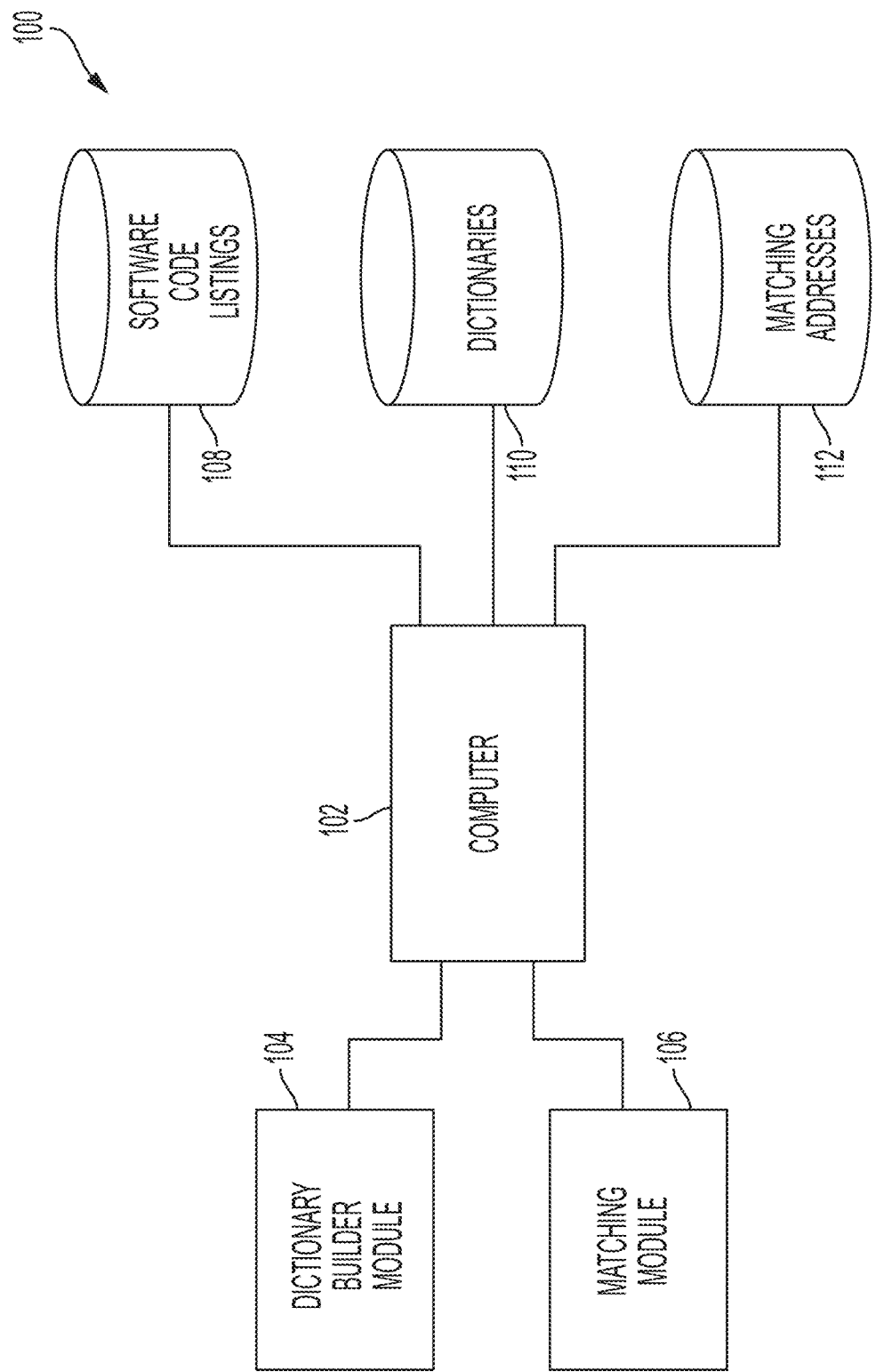
FIG. 1 depicts a block diagram of a system for identifying common instructions across different code releases according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

One or more embodiments of the present invention automate the identification of common instructions across different releases of a software program. A unique instruction identifier is generated using a hashing algorithm and utilized by one or more embodiments of the present invention to identify matching instructions across different code releases. When two software code listings are being compared, a dictionary that includes key/value pairs is built for each of the software code listings. In a dictionary built based on a first of the two software code listings, each of the keys is an instruction address, and each of the values is a hash value generated, for example, based on a previous label, a label offset index, the instruction at the instruction address, and an operand(s) of the instruction. In a dictionary built based on a second of the two software code listings, each of the values is an instruction address, and each of the keys is a hash value generated, for example, based on a previous label, a label offset index, the instruction at the instruction address, and an operand(s) of the instruction. By having the keys and the values in the dictionaries reversed, they can be used together to form an effective translation mechanism between the two different releases whose instruction addresses may have changed. The instruction addresses of instructions in the first software code listing are correlated with the instruction addresses of the same instructions in the second software code listing. As will be appreciated by those skilled in the art, the keys and values in a dictionary can easily be swapped (if needed) for subsequent comparisons to other versions of the software program.

One or more embodiments of the present invention can be utilized to ensure full test coverage of common code (e.g., particular paths and/or instructions) that is located in different releases of a software program. During the testing of a software program, snapshots of the instruction addresses being executed can be taken periodically (e.g., every three milliseconds, every eight milliseconds). The instruction addresses can be accumulated over time and this information can be used to see the coverage of the testing. There is often a lot of duplicate code in two releases, or versions, of the same software program. The duplicate code, however, may be located at different instruction addresses in the two releases. Thus, a translation needs to take place between the instruction addresses in the two releases to verify that the duplicate code has been exercised, or covered, by the test in both releases of the software program. A typical test may involve hundreds of computers and as many as twenty versions of the software code, so manually correlating instructions between releases can be a tedious and error prone task.

One or more embodiments of the present invention automate this process of translating the instruction addresses of common code in different releases. The resulting translation function can then be used for test case failure isolation as well as test coverage consolidation between releases.

One or more embodiments of the present invention can also be utilized to determine the differences between two releases, that is, what instructions are included in one release and not the other, and vice versa. This can be useful when debugging an error that occurs in one release and not the other and/or when debugging an error that occurs in both releases.

In accordance with one or more embodiments of the present invention, the software code listing is an assembler listing. As known in the art, updates to assembler listings are localized between labels. The data being hashed and compared between two assembler listings can include, for each instruction address in the listing, the previous label in the listing, the label offset index of the instruction address, the instruction at the instruction address, and any operands of the instruction. The previous label in the listing is the label that is the closet previous label to the instruction address. The data being hashed will not change when the instruction is moved to a different location, or instruction address, in the software code listing. In addition, as is known in the art, a match between these values indicates that the contents of the instructions are the same.

Any hash technique known in the art may be implemented by one or more embodiments of the present invention. In the examples described herein, a secure hash algorithm 1 (SHA-1) cryptographic hash function is utilized. The SHA-1 hash function takes an input and produces, or outputs, a one hundred and sixty-bit hash value known as a message digest. The message digest is typically rendered as a hexadecimal number, forty digits long. Other hash functions such as, but not limited to, message-digest 5 (MD5), SHA-2, and cyclical redundancy check 32 bit (CRC32) can also be utilized by one or more embodiments of the present invention.

Contemporary approaches to comparing source code across different releases are largely manual and tedious tasks because the instruction addresses change as lines of code are added and deleted between releases. A person, such as a tester or a coder, has to examine each line of code in both of the listings being compared to identify the instructions that are different and those that are the same (e.g., those that match, or correspond, to each other). This manual approach can be expensive in terms of labor cost and elapsed time to perform the comparison. In addition, the manual approach can be error prone due to human error. One or more embodiments of the present invention address one or more of these shortcomings of contemporary approaches by providing an automated comparison between source code listings to identify corresponding lines of code. Automating the process can result in higher accuracy in identifying matching lines of code. In addition, by automating the process, less human time is required and the elapsed time for generating the results can be reduced.

Turning now to FIG. 1, a block diagram of a system 100 for identifying common instructions across different code releases is generally shown in accordance with one or more embodiments of the present invention. The components shown in FIG. 1 include a computer 102, a dictionary builder module 104, a matching module 106, a software code listings storage device 108, a dictionaries storage device 110, and a matching addresses storage device 112. As shown in FIG. 1, the computer 102 executes the dictionary builder module 104 and the matching module 106. The computer can be implemented by any computer known in art, such as computer 501 of FIG. 5 below.

Input to executing the dictionary builder module 104 includes a software code listing accessed or received, for example, from the software code listings storage device 108. The software code listings storage device 108 may include multiple software code listings and can be implemented using any storage device(s) known in the art. In addition, the contents of the software code listings storage device 108 can be organized in any manner and in any format known in the art. Examples of storage devices include, but are not limited to: direct access storage devices (DASDs) and flash drives. Examples of formats include, but are not limited to: relational databases, indexed data files, and vectors.

The dictionary builder module 104 builds a dictionary for the software code listing that is input. In accordance with one or more embodiments of the present invention, the dictionary built by the dictionary builder module 104 includes a plurality of entries (e.g., one for each instruction address in the software code listing), and each entry includes an instruction address and a hash of data that uniquely identifies the instruction at the instruction address. Each entry can be referred to as a key/value pair. The instruction address in the dictionary can be designated as the key and the hash of data that uniquely identifies the instruction at the instruction address can be designated as the value, or vice versa. The dictionary for the software code listing which is output by the dictionary builder module 104 can be stored, for example, in dictionaries storage device 110. The dictionaries storage device 110 may include multiple dictionaries and can be implemented using any storage device known in the art. In addition, contents of the dictionaries storage device 110 can be organized in any manner and in any format known in the art. Contents of a dictionary can also be referred to as instances, where a dictionary has a plurality of key/value pairs, and each key is referred to as a key instance and each value is referred to as a value instance.

Input to executing the matching module 106 includes a first dictionary for a first software code listing and a second dictionary for a second software code listing which are access or received for example, from the dictionaries storage device 110. The matching module correlates, for any common code, the instruction addresses in the first software code listing and the instruction addresses in the second software code listing. The correlated, or matching, addresses output by the matching module 106 can be stored, for example, in matching addresses storage device 112. The matching addresses storage device 112 may include matching addresses for multiple listings and can be implemented using any storage device known in the art. In addition, contents of the matching addresses storage device can be organized in any manner and in any format known in the art.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, programs, functional blocks, connections between functional blocks, modules, inputs, outputs, etc.). For example, the dictionary builder module 104 and the matching module 106 may be executed on different computers. In other embodiments, all or a subset of the components may be located in different geographic locations and connected via one or more networks (e.g., a cloud network, the Internet). In further embodiments, all or a subset of the storage devices shown in FIG. 1 are combined. In still other embodiments, all or a subset of the storage devices shown in FIG. 1 are separated into two or more storage devices. Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
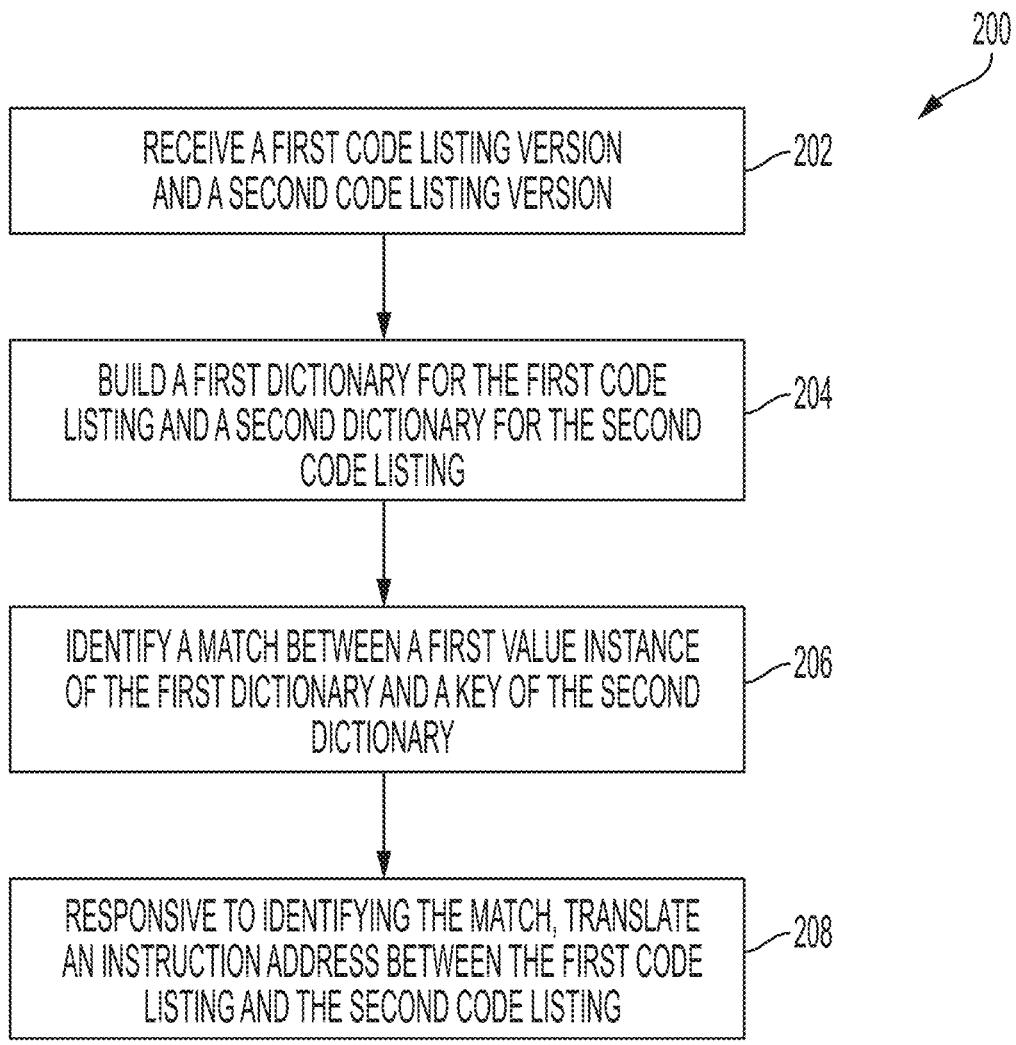
FIG. 2 depicts a process flow diagram of a method for identifying common instructions across different code releases according to one or more embodiments of the present invention.

Turning now to FIG. 2, a process flow diagram of a method 200 for identifying common instructions across different code releases is generally shown in accordance with one or more embodiments of the present invention. The processing shown in FIG. 2 may be implemented by dictionary builder module 104 and matching module 106 of FIG. 1 executing on computer 102 of FIG. 1.

At block 202, a first code listing version and a second code listing version are received. One or both of the first code listing and the second code listing can be stored in the software code listings storage device 108 of FIG. 1. An example of a first code listing 322a and a second code listing 322b in assembler code is shown below in FIG. 3A.

At block 204, a first dictionary is built for the first code listing and a second dictionary is built for the second code listing. The first dictionary can include keys that are the instruction address from the first code listing and values that are the hash of data that identifies an instruction at the instruction address. The second dictionary can include keys that are the hash of data that identifies an instruction at the instruction address in the second code listing and the values that are the instruction address. As described previously, by having the keys and the values in the dictionaries reversed, they can be used together to form an effective translation mechanism between the two different releases whose instruction addresses may have changed. An example of a first dictionary 324a and a second dictionary 324b is shown below in FIG. 3B.

At block 206 of FIG. 2, a match between a first value instance of the first dictionary and a key of the second dictionary is identified, indicating that the content of the two instructions is identical. At block 208, the instruction addresses of the matching instructions are translated to correlate the locations of the common code in both of the first code listing and the second code listing. An example of the correlation, or matching, of addresses, between the two versions of code is shown below in FIG. 3B.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Turning now to FIG. 3A, an example of software code listings 322 is generally shown in accordance with one or more embodiments of the present invention. The software code listings 322 can be stored, for example in software code listings storage device 108 of FIG. 1. FIG. 3A depicts an example of two sample software code listings 322a 322b (referred to collectively herein as software code listings 322) from two different releases of the same function, or software component. Each of the listings shown in FIG. 3A include label offset indices 302a 302b, instruction addresses 304a 304b, opcodes 306a 306b (also referred to herein as instructions), operands 308a 308b, labels 310a 310b, relative locations of addresses 312a 312b, line numbers 314a 314b, and source code/comments 316a 316b.

Figure 3B:
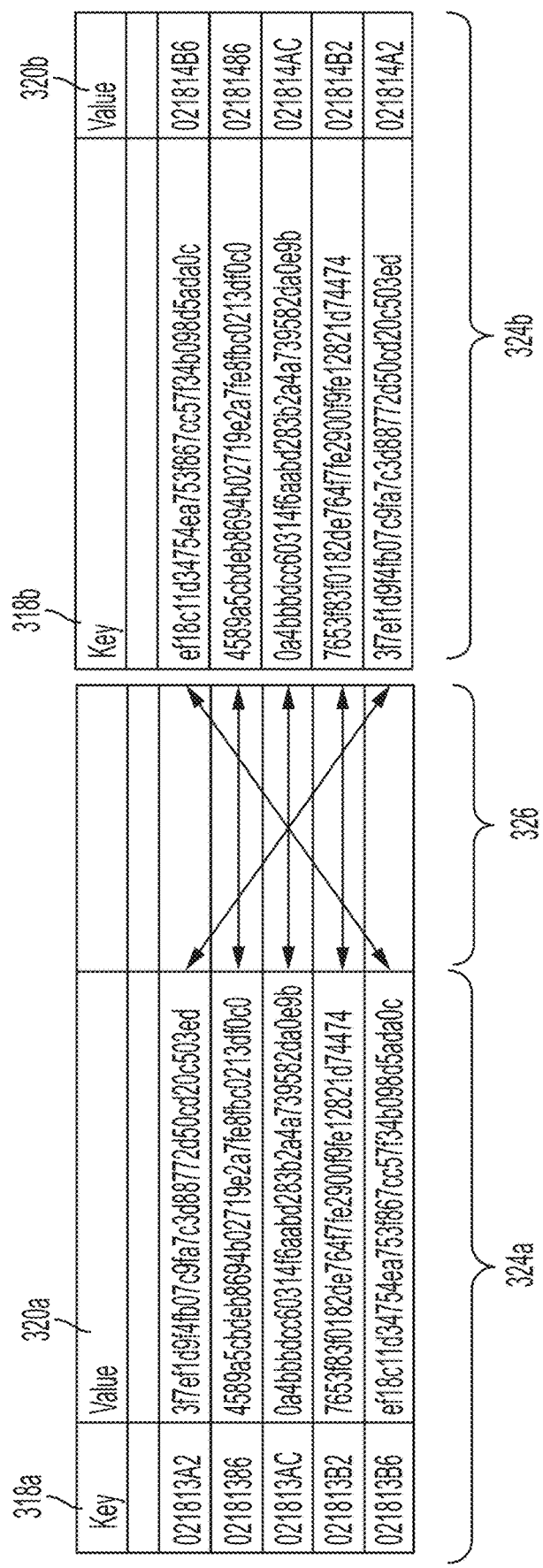
FIG. 3B depicts an example of dictionaries and address correlations for the software code listings of FIG. 3A according to one or more embodiments of the present invention.

Turning now to FIG. 3B, an example of dictionaries 324 and address correlations 326 for the software code listings 322 of FIG. 3A are generally shown in accordance with one or more embodiments of the present invention. The dictionaries 324 can be stored, for example in dictionaries storage device 110 of FIG. 1, and the correlations 326 can be stored, for example in matching addresses storage device 112. FIG. 3B depicts an example of dictionaries 324a 324b (referred to collectively herein as dictionaries 324) that are built based on the software code listings 322 of FIG. 3A. Dictionary 324a includes an entry for each instruction address 304a in the source code listing 322a. Dictionary 324a shows the dictionary key 318a as the instruction address 304a and the value 320a is the SHA-1 message digest of the label 310a, label offset index 302a, opcode 306a, and operand 308a of the instruction at the instruction address 304a. Dictionary 324b is constructed similarly from software code listing 322b, except in this case the key 318b is the SHA-1 message digest and the value 320b is the instruction address 304b.

As shown in FIG. 3B, the values 320a of dictionary 324a are compared to the keys 318b of dictionary 324b to identify matching instructions. As known in the art, a dictionary is a general-purpose data structure for storing a group of objects. A dictionary has a set of keys and each key has a single associated value (i.e., a "key/value pair"). When presented with the key, the dictionary returns the associated value. In accordance with one or more embodiments of the present invention, a dictionary data structure is used to facilitate quick lookups since the size of the tables can large (e.g., 100,000 entries, 250,000 entries, 500,000 entries). One or more embodiments of the present invention can utilize a built-in programming language dictionary structure such as, but not limited to, that provided by Python. Python dictionaries are built internally using hash tables in the form of an array of indices. Therefore, when Python is used, indexing is performed internal to the data structure.

The instruction address correlations 326 shown in FIG. 3B show that instruction address "021813A2" in software code listing 322a correlates to instruction address "021814A2" in software code listing 322b. When the two instruction addresses are correlated, or have the same hash, this indicates that the same instruction is being performed at both addresses. Similarly, instruction address "02181386" in software code listing 322a correlates to instruction address "02181486" in software code listing 322b; instruction address "021813AC" in software code listing 322a correlates to instruction address "021814AC" in software code listing 322b; instruction address "021813B2" in software code listing 322a correlates to instruction address "021814B2" in software code listing 322b; and instruction address "021813B6" in software code listing 322*a* correlates to instruction address "021814B6" in software code listing 322*b*. In accordance with one or more embodiments of the present invention, the correlated instruction addresses are stored for example, as a dictionary or table in matching addresses storage device 112 of FIG. 1.

Figure 4:
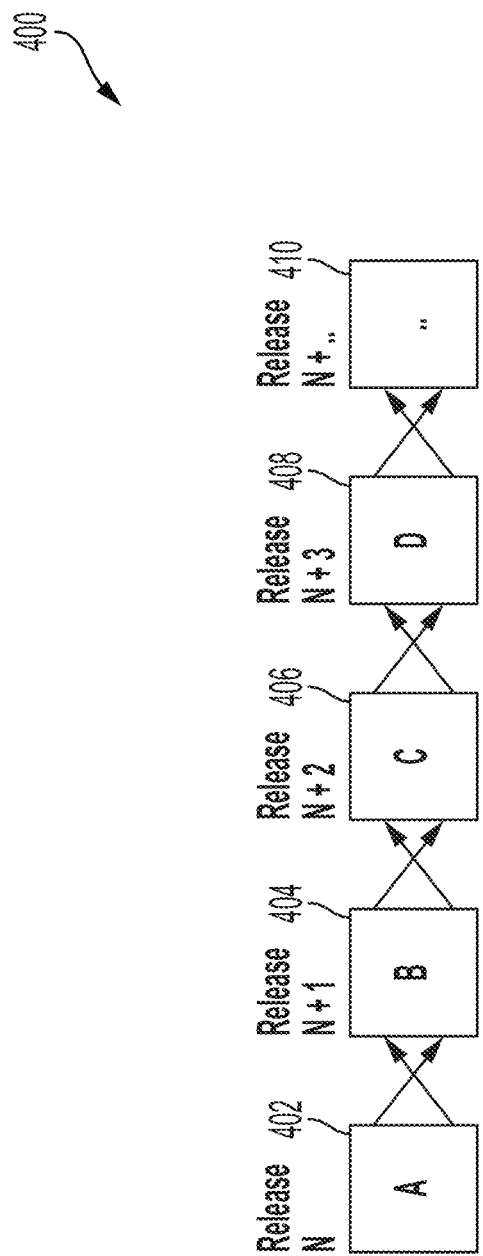
FIG. 4 depicts a cascading comparison of code releases according to one or more embodiments of the present invention.

Turning now to FIG. 4, a cascading comparison 400 of code releases is generally shown in accordance with one or more embodiments of the present invention. FIG. 4 depicts several code releases: Release N 402, Release N+1 404, Release N+2 406, Release N+3 408, and Release N+ . . . 410. In accordance with one or more embodiments of the present invention, the processing described above in reference to FIGS. 3A and 3B is performed between sequential code releases for each of the code releases of a software product that are currently in use (or being supported). For example, Release N 402 can correspond to software code listing 322*a* of FIG. 3A and Release N+1 404 can correspond to software code listing 322*b* of FIG. 3A. The next sequential version after N+1 404 is shown in FIG. 4 as Release N+2 406, and correlating instruction addresses between Release N+1 404 and Release N+2 are extracted using the processing described above in reference to FIGS. 2, 3A, and 3B. This process continues between the different code releases.

In accordance with one or more embodiments of the present invention, the cascading listing of tables shown in FIG. 4 can be used to perform a continuous lookup function across sequential code releases. The resulting data structure makes it possible to look up and count (e.g., for coverage) any change in any release.

Figure 5:
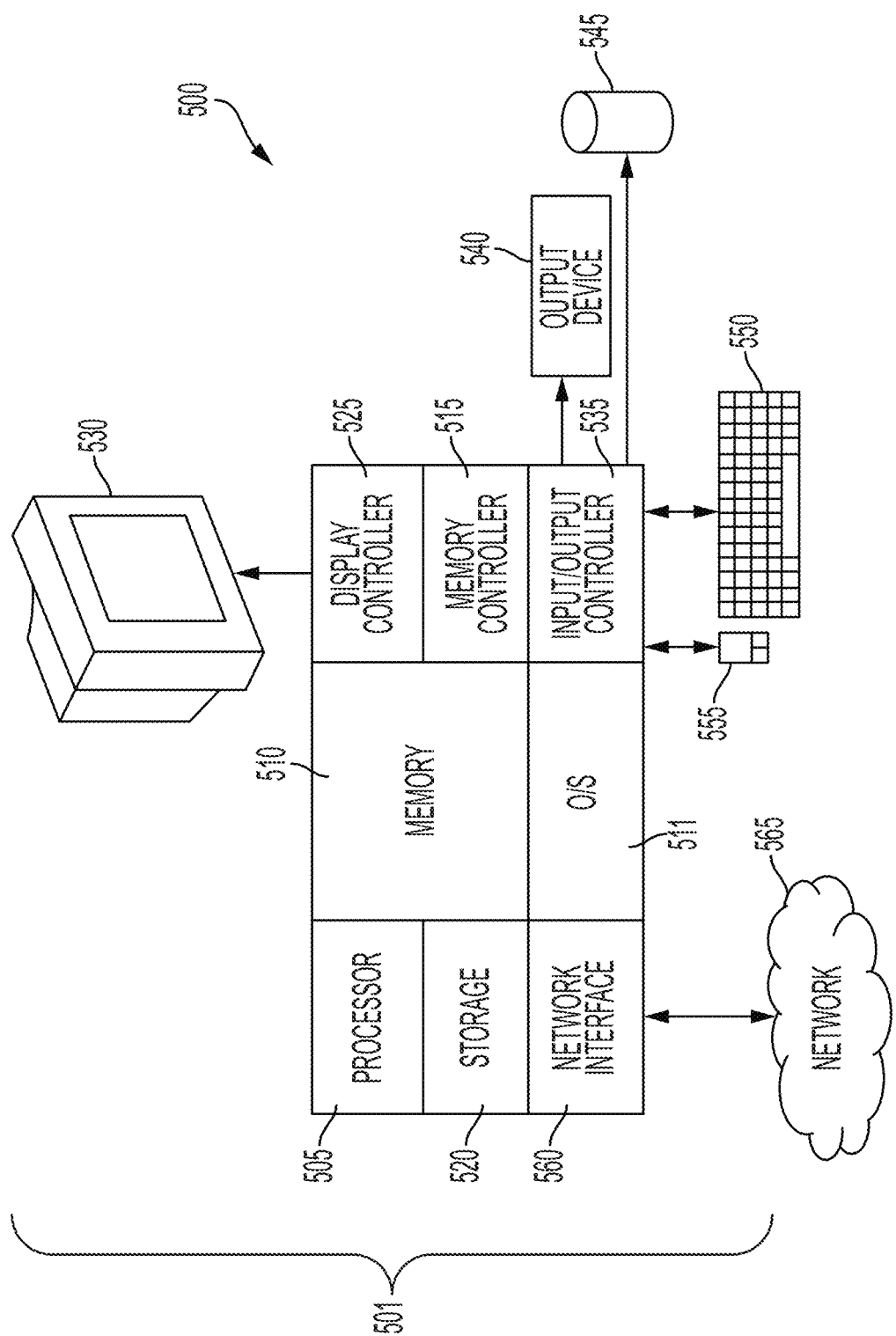
FIG. 5 illustrates a system for identifying common instructions across different code releases according to one or more embodiments of the present invention.

Turning now to FIG. 5, a computer system 500 for identifying common instructions across different code releases is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 500 therefore may include general-purpose computer or mainframe 501 capable of running multiple instances of an O/S simultaneously.

In one or more exemplary embodiments of the present invention, in terms of hardware architecture, as shown in FIG. 5, the computer 501 includes one or more processors 505, memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 535 may include a plurality of sub-channels configured to access the output devices 540 and 545. The sub-channels may include fiber-optic communications ports.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the processor 505.

The instructions in memory 510 may include one or more separate programs, each of which comprises an ordered listing of executable instructions for implementing logical functions. In the example of FIG. 5, the instructions in the memory 510 a suitable operating system (OS) 511. The operating system 511 essentially controls the execution of other computer programs and provides scheduling, input-output control, file and data management, memory management, and communication control and related services.

In accordance with one or more embodiments of the present invention, the memory 510 may include multiple logical partitions (LPARs) each running an instance of an operating system. The LPARs may be managed by a hypervisor, which may be a program stored in memory 510 and executed by the processor 505.

In one or more exemplary embodiments of the present invention, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530.

In one or more exemplary embodiments of the present invention, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals. In addition, or alternatively, the network 565 may be implemented by a cloud computing environment.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to execute instructions stored within the memory 510, to communicate data to and from the memory 510, and to generally control operations of the computer 501 pursuant to the instructions.

It is understood that one or more embodiments of the present invention are capable of being implemented in conjunction with any type of computing environment now known or later developed.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
receiving, by a processor, a first dictionary for a first code listing of a first version of a software program, the first dictionary comprising a plurality of key/value pairs, wherein key instances of the first dictionary include instruction addresses of the first code listing and value instances of the first dictionary include hashes of data that uniquely identify instructions at the instruction addresses in the first code listing;
receiving, by the processor, a second dictionary for a second code listing of a second version of the software program, the second dictionary comprising a plurality of key/value pairs, wherein key instances of the second dictionary include hashes of data that uniquely identify instructions at instruction addresses in the second code listing, and value instances of the second dictionary include instruction addresses of the second code listing;
identifying, by the processor, a match between a value instance of the first dictionary and a key instance of the second dictionary; and
responsive to identifying the match, translating, by the processor, an instruction address between the first code listing and the second code listing.

2. The method of claim 1, further comprising:
building the first dictionary based at least in part on the first code listing; and
building the second dictionary based at least in part on the second code listing.

3. The method of claim 1, wherein the data that uniquely identifies an instruction at an instruction address in the first code listing comprises a previous label of the instruction address, a label offset index, and the instruction at the instruction address.

4. The method of claim 3, wherein the data that uniquely identifies an instruction at an instruction address in the first code listing further comprises an operand of the instruction at the instruction address.

5. The method of claim 1, wherein the hash is a secure hash algorithm 1 (SHA-1) cryptographic hash function.

6. The method of claim 1, wherein the first and second code listings are assembler code listings.

7. The method of claim 1, further comprising utilizing the translated instruction address to determine coverage of a test case applied to one or both of the first code listing and the second code listing.

8. The method of claim 1, further comprising utilizing the translated instruction address to determine differences between the first code listing and the second code listing.

9. A system comprising:
one or more processors for executing computer readable instructions, the computer readable instructions controlling the one or more processors to perform operations comprising:
receiving a first dictionary for a first code listing of a first version of a software program, the first dictionary comprising a plurality of key/value pairs, wherein key instances of the first dictionary include instruction addresses of the first code listing and value instances of the first dictionary include hashes of data that uniquely identify instructions at the instruction addresses in the first code listing;
receiving a second dictionary for a second code listing of a second version of the software program, the second dictionary comprising a plurality of key/value pairs, wherein key instances of the second dictionary include hashes of data that uniquely identify instructions at instruction addresses in the second code listing, and value instances of the second dictionary include instruction addresses of the second code listing;
identifying a match between a value instance of the first dictionary and a key instance of the second dictionary; and
responsive to identifying the match, translating an instruction address between the first code listing and the second code listing.

10. The system of claim 9, wherein the operations further comprise:
building the first dictionary based at least in part on the first code listing; and
building the second dictionary based at least in part on the second code listing.

11. The system of claim 9, wherein the data that uniquely identifies an instruction at an instruction address in the first code listing comprises a previous label of the instruction address, a label offset index, and the instruction at the instruction address.

12. The system of claim 11, wherein the data that uniquely identifies an instruction at an instruction address in the first code listing further comprises an operand of the instruction at the instruction address.

13. The system of claim 9, wherein the hash is a secure hash algorithm 1 (SHA-1) cryptographic hash function.

14. The system of claim 9, wherein the operations further comprise utilizing the translated instruction address to determine coverage of a test case applied to one or both of the first code listing and the second code listing.

15. The system of claim 9, wherein the operations further comprise utilizing the translated instruction address to determine differences between the first code listing and the second code listing.

16. A computer program product comprising a computer readable storage medium having program instructions embodied therewith, the program instructions executable by a processor to cause the processor to perform operations comprising:
receiving a first dictionary for a first code listing of a first version of a software program, the first dictionary comprising a plurality of key/value pairs, wherein key instances of the first dictionary include instruction addresses of the first code listing and value instances of the first dictionary include hashes of data that uniquely identify instructions at the instruction addresses in the first code listing;
receiving a second dictionary for a second code listing of a second version of the software program, the second dictionary comprising a plurality of key/value pairs, wherein key instances of the second dictionary include hashes of data that uniquely identify instructions at instruction addresses in the second code listing, and value instances of the second dictionary include instruction addresses of the second code listing;
identifying a match between a value instance of the first dictionary and a key instance of the second dictionary; and
responsive to identifying the match, translating an instruction address between the first code listing and the second code listing.

17. The computer program product of claim 16, wherein the data that uniquely identifies an instruction at an instruction address in the first code listing comprises a previous label of the instruction address, a label offset index, and the instruction at the instruction address.

18. The computer program product of claim 16, wherein the operations further comprise utilizing the translated instruction address to determine coverage of a test case applied to one or both of the first code listing and the second code listing.

19. The computer program product of claim 16, wherein the operations further comprise utilizing the translated instruction address to determine differences between the first code listing and the second code listing.

* * * * *